United States Patent
Hague

(10) Patent No.: US 10,066,719 B2
(45) Date of Patent: Sep. 4, 2018

(54) DAMPER ASSEMBLY INCLUDING SPRING SUPPORT PLATE CONFIGURED FOR RECEIVING ARC SPRINGS AFTER ASSEMBLY

(71) Applicant: Schaeffler Technologies AG & Co. KG, Herzogenaurach (DE)

(72) Inventor: Shane Hague, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 265 days.

(21) Appl. No.: 15/092,571

(22) Filed: Apr. 6, 2016

(65) Prior Publication Data

US 2017/0292593 A1 Oct. 12, 2017

(51) Int. Cl.
*F16H 45/02* (2006.01)
*F16D 3/12* (2006.01)

(52) U.S. Cl.
CPC .......... *F16H 45/02* (2013.01); *F16D 3/12* (2013.01); *F16D 2250/0084* (2013.01); *F16H 2045/0221* (2013.01)

(58) Field of Classification Search
CPC ..... F16D 3/12; F16H 45/02; F16H 2045/0252
USPC .......................................... 60/338
See application file for complete search history.

(56) References Cited

U.S. PATENT DOCUMENTS

| | | | |
|---|---|---|---|
| 5,105,921 A | 4/1992 | Fujimoto | |
| 2004/0248654 A1* | 12/2004 | Jackel | F16F 15/10 464/68.92 |
| 2012/0241271 A1* | 9/2012 | Steinberger | F16D 3/12 192/3.25 |

OTHER PUBLICATIONS

M.R. Louthan, "Optical Metallography," ASM Handbook, vol. 10: Materials Characterizations, ASM International, p. 299 to 308, 1986.
"Chapter 6: Austenitic Stainless Steels," Stainless Steels for Design Engineers, ASM International, p. 69 to 78, 2008.

* cited by examiner

*Primary Examiner* — F. Daniel Lopez
*Assistant Examiner* — Daniel Collins
(74) *Attorney, Agent, or Firm* — Davidson, Davidson & Kappel, LLC

(57) ABSTRACT

A damper assembly for a torque converter is provided. The damper assembly includes a spring retainer including an interior space configured for holding springs and a spring support plate fixed to the spring retainer to define an inlet gap between a first section of an outer circumference of the spring support plate and the spring retainer for insertion of one of the springs. The outer circumference of the spring support plate further includes a second section circumferentially offset from the first section. The second section is arranged and configured with respect to spring retainer for axially holding the plurality of springs in the interior space during operation of the damper assembly. A torque converter and a method of forming a damper assembly for a torque converter are also provided.

17 Claims, 3 Drawing Sheets

DAMPER ASSEMBLY INCLUDING SPRING SUPPORT PLATE CONFIGURED FOR RECEIVING ARC SPRINGS AFTER ASSEMBLY

The present disclosure relates generally to torque converters and more specifically to damper assemblies for torque converters.

BACKGROUND

U.S. Pat. No. 5,105,921 discloses a torque converter including a damper assembly having a spring retainer design installed within a piston rim.

SUMMARY OF THE INVENTION

A damper assembly for a torque converter is provided. The damper assembly includes a spring retainer including an interior space configured for holding springs and a spring support plate fixed to the spring retainer to define an inlet gap between a first section of an outer circumference of the spring support plate and the spring retainer for insertion of one of the springs. The outer circumference of the spring support plate further includes a second section circumferentially offset from the first section. The second section is arranged and configured with respect to spring retainer for axially holding the plurality of springs in the interior space during operation of the damper assembly. A torque converter and a method of forming a damper assembly for a torque converter are also provided.

A torque converter including the damper assembly and a turbine drivingly connected to the damper assembly is also provided.

A method of forming a damper assembly for a torque converter is also provided. The method includes fixing a spring support plate to a spring retainer and inserting a spring into an inlet gap formed by a first section of an outer circumference of the spring support plate and the spring retainer such that a second section of the outer circumference of the spring support plate and the spring retainer axially hold the spring in place in an interior of the spring retainer.

BRIEF DESCRIPTION OF THE DRAWINGS

The present invention is described below by reference to the following drawings, in which.

DETAILED DESCRIPTION

The disclosure provides a damper assembly for a torque converter including a spring support plate including a cutout to allow the damper assembly to be put together, with the arc springs inserted thereafter. The cutout includes two sections including a first gap larger than the arc spring diameter for installation, and a second gap less than the arc spring diameter to retain the spring during application.

Figure 1:
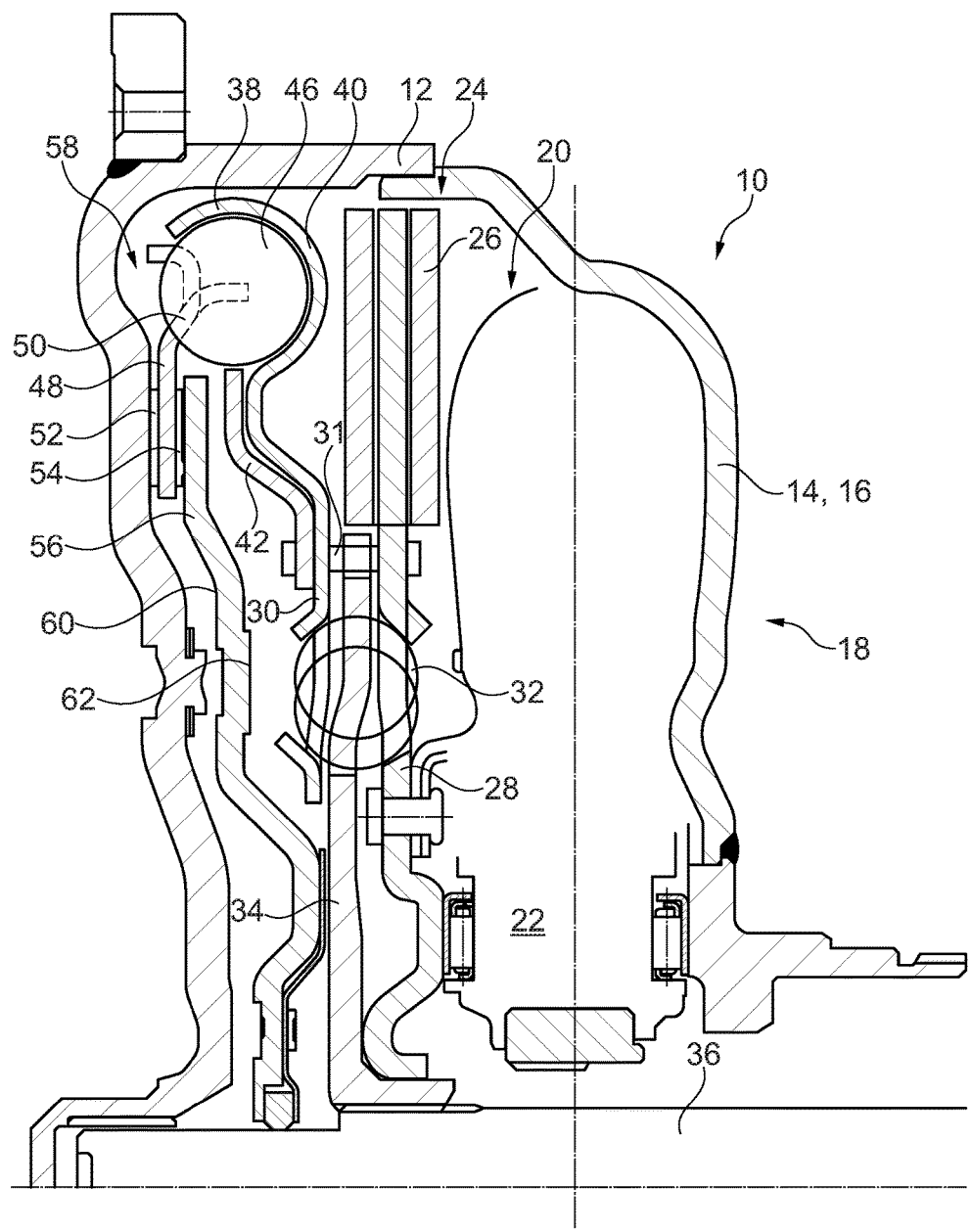
FIG. 1 schematically shows a cross-sectional side view of a torque converter in accordance with an embodiment of the present invention.

FIG. 1 schematically shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 opposite impeller 18 and a stator 22 axially between impeller 18 and turbine 20. On a front-cover side of turbine 20, turbine 20 is connected to a damper assembly 24. Damper assembly 24 includes a centrifugal pendulum vibration absorber 26 formed at a radial outer end of a first cover plate 28. Damper assembly 24 further includes a second cover plate 30 riveted to first cover plate 28 by a rivet 31, with cover plates 28, 30 supporting a plurality of circumferentially spaced radially inner set of springs 32 axially therebetween. Cover plates 28, 30 transfer torque from turbine 20 to a drive flange 34 axially between cover plates 28, 30 via springs 32. Drive flange 34 in turn drives a transmission input shaft 36. At a radially outer end thereof, second cover plate 30 includes a spring retainer 38 formed by a rounded outer circumference 40 of cover plate 30 and a spring support plate 42 riveted to second cover plate 30 by rivet 31. Spring support plate 42 is configured for holding springs 46 in rounded portion 40 of spring retainer 38. Springs 46 in turn drivingly engage a clutch plate 48 via circumferentially spaced outer tabs 50 of clutch plate 48, each for extending into one of the spaces circumferentially between springs 46.

At a radially inner end thereof, clutch plate 48 includes friction material 52, 54 on axial sides thereof. Front cover side friction material 52 is arranged for engaging an inner surface of front cover 12 and rear cover side friction material 54 is arranged for engaging a radial outer end of a piston 56. Piston 56 and clutch plate 48 form a lockup clutch 58 for drivingly coupling turbine 20 to front cover 12 via damper assembly 24. Fluid pressure differences between a front cover side 60 of piston 56 and a rear cover side 62 of piston 56 control whether clutch plate 48 engages or is disengaged from front cover 12 via piston 56.

Figure 2:
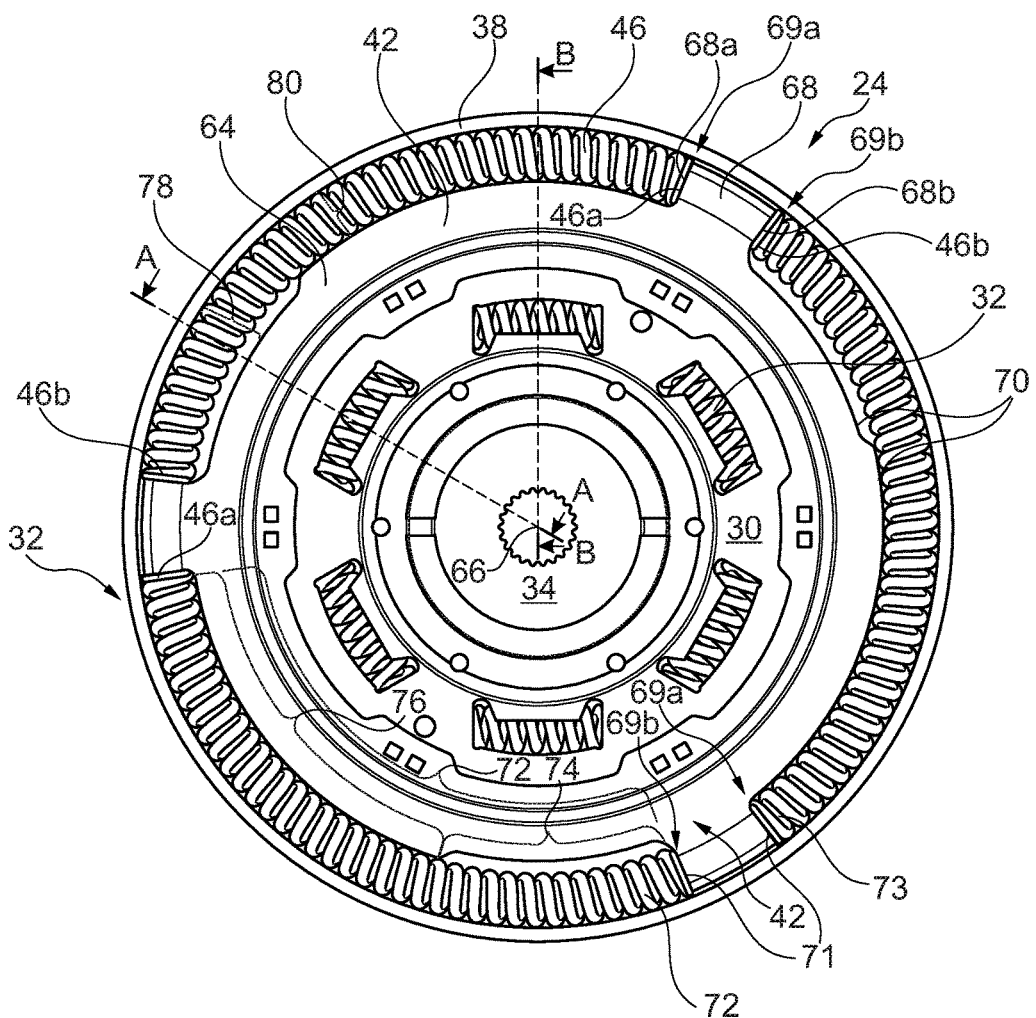
FIG. 2 schematically shows a plan view of a damper assembly of the torque converter shown in FIG. 1.

FIG. 2 shows a plan view of damper assembly 24. In the embodiment shown in FIG. 2, damper assembly includes six springs 32 supported axially between turbine-side cover plate 28 (FIG. 1) and front cover-side cover plate 30 and three springs 46 supported by spring retainer 38 and spring support plate 42. Spring support plate 42 includes a ring-shaped base section 64 extending continuously around a center axis 66 of damper assembly 24 and radially extending tabs 68 extending radially outward from an outer circumference 70 of base section 64. The number of tabs 68 is equal to the number of springs 46—three in this embodiment. Tabs 68 each include a first circumferential edge 68a for acting on a first circumferential edge 46a of one of springs 46 and a second circumferential edge 68b for acting on a second circumferential edge 46b of another of springs 46. In the embodiment shown in FIG. 2, each circumferential edge 68a, 68b of each tab 68 is provided with a respective spring seat 69a, 69b, with each spring seat 69a, 69b including a base 71 abutting the respective circumferential edge 68a, 68b and a cylindrical projection 73 extending into the inside of the corresponding spring 46.

Radially inside of tabs 68, outer circumference 70 of base section 64 includes three circumferentially extending sections 72, with each circumferentially extending section 72 extending circumferentially between two of tabs 68. Each circumferentially extending section 72 includes a radially inner section 74 and a radially outer section 76 positioned further radially from center axis 66 than radially inner section 74. Spring support plate 42 is arranged with respect to spring retainer 38 and springs 46 such that springs 46 can be inserted into spring retainer 38 at a gap 78 formed radially between spring retainer 38 and radially inner section 74 after cover plates 28, 30 are fixed together and spring support plate 42 is fixed to cover plate 30. Gap 78 is greater in size than an outer diameter of springs 46, allowing the longitudinal end of the spring 46 including circumferential edge 46a to be inserted in the gap 78 and fed into spring retainer 38 until circumferential edge 46a contacts seat 69a and a portion of the spring 46 is axially behind radially outer section 76. After the spring 46 is inserted into spring retainer 38, radially outer section 76 holds spring axially between spring support plate 42 and spring retainer, preventing the spring 46 from sliding out of damper assembly 24 during operation. A gap 80 formed radially between spring retainer 38 and radially outer section 76 is lesser in size than the outer diameter of springs 46.

Figure 3:
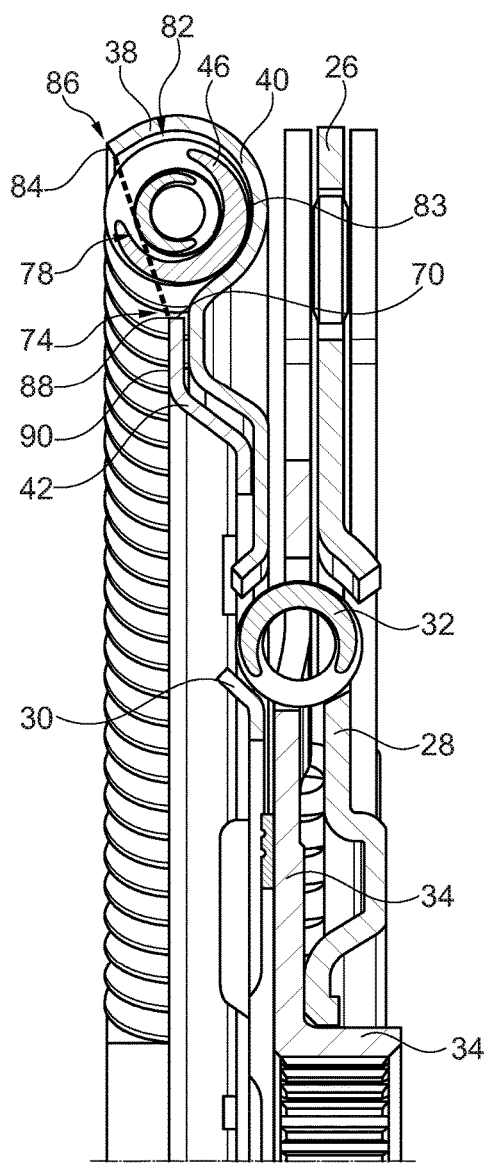
FIG. 3 schematically shows a cross-sectional side view of the damper assembly along A-A of FIG. 2.
Figure 4:
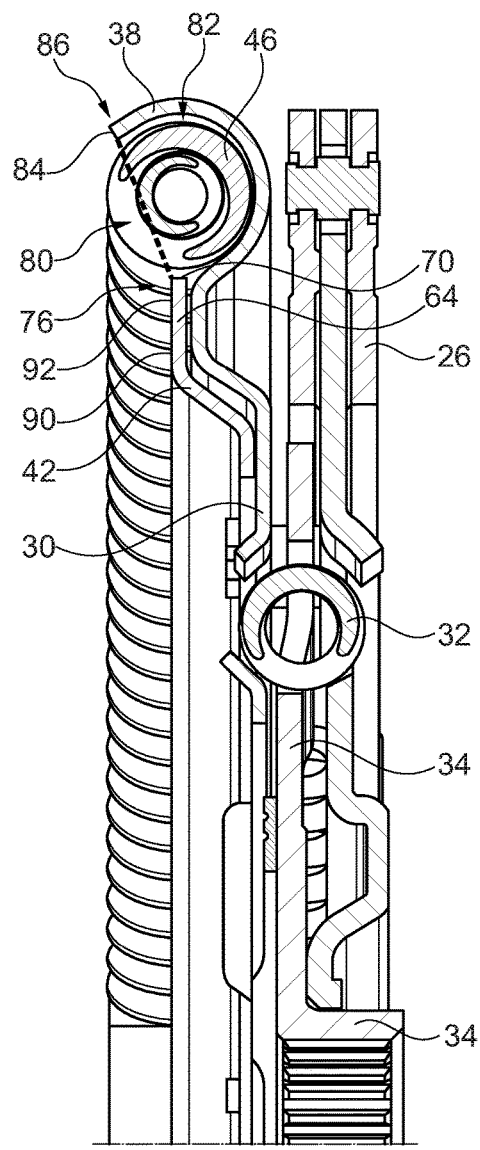
FIG. 4 schematically shows a cross-sectional side view of the damper assembly along B-B of FIG. 2.

FIG. 3 schematically shows a cross-sectional side view of the damper assembly 24 along A-A of FIG. 2 and FIG. 4 schematically shows a cross-sectional side view of the damper assembly 24 along B-B of FIG. 2. FIG. 3 illustrates damper assembly 24 along radially inner section 74 and FIG. 4 illustrates damper assembly 24 along radially outer section 76.

FIG. 3 illustrates gap 78 being sized greater than the outer diameter of spring 46 such that spring 46 can be axially inserted into an interior space 82 of spring retainer 38 end first as described above and then the outer circumference of spring 46 is slid along an interior surface 83 of spring retainer 38 until edge. More specifically, gap 78 is formed as an inlet gap for inserting springs 46 and is defined by a distance between an innermost radial surface 84 of an axial tip 86 of the free end of spring retainer 38 and an axial edge 88 of radially inner section 74 of outer circumference 70 of base section 64. Axial edge 88 is formed at a front cover-side axial surface 90 of spring support plate 62.

FIG. 4 illustrates gap 80 being sized smaller than the outer diameter of spring 46 such that spring 46 is prevented by radially outer section 76 from axially sliding out of interior space 82 of spring retainer 38 during the operation of damper assembly 24. More specifically, gap 80 is defined by a distance between innermost radial surface 84 of axial tip 86 of the free end of spring retainer 38 and an axial edge 92 of radially outer section 76 of outer circumference 70 of base section 64. Axial edge 92 is formed at front cover-side axial surface 90 of spring support plate 62. Radially outer section 76 contacts the outer circumference of spring 46 to prevent spring 46 from axially sliding out of interior space 82 of spring retainer 38.

Damper assembly 24 may be advantageously formed by fixing the springs 46 in damper assembly 24 after the other components are fixed together, instead of simultaneously therewith. More specifically, cover plates 28, 30 and spring support plate 42 may be first fixed together such that cover plates 28, 30 hold flange 34 and springs 32 therebetween. Then, after cover plates 28, 30 and spring support plate 42 are fixed together, springs 46 may be inserted to interior space 82 of spring retainer 38. The formation of damper assembly 24 may thus avoid the assembly all components simultaneously, eliminating the need for complex tooling and allowing for a shorter assembly time.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a torque converter comprising:
   a spring retainer including an interior space configured for holding springs and
   a spring support plate fixed to the spring retainer to define an inlet gap between a first section of an outer circumference of the spring support plate and the spring retainer for insertion of one of the springs, the outer circumference of the spring support plate further including a second section circumferentially offset from the first section, the second section being arranged and configured with respect to spring retainer for axially holding the springs in the interior space during operation of the damper assembly.

2. The damper assembly as recited in claim 1 wherein the inlet gap is greater in size than an outer diameter of the one spring.

3. The damper assembly as recited in claim 2 wherein the inlet gap is defined by a distance between an innermost radial surface of an axial tip of a free end of the spring retainer and an axial edge of the first section.

4. The damper assembly as recited in claim 1 wherein the second section is spaced from the spring retainer a distance less than an outer diameter of the one spring.

5. The damper assembly as recited in claim 4 wherein the distance the second section is spaced from the spring retainer is defined by an innermost radial surface of an axial tip of a free end of the spring retainer and an axial edge the second section.

6. The damper assembly as recited in claim 1 wherein the spring support plate includes a ring-shaped base section including the first and second sections and radially extending tabs protruding radially outward from the base section.

7. The damper assembly as recited in claim 1 further comprising the springs in the interior space of the spring retainer, the spring being axially held in place by the second section.

8. The damper assembly as recited in claim 1 further comprising two cover plates supporting a further set of springs, the spring retainer being provided on one of the cover plates.

9. The damper assembly as recited in claim 8 further comprising a drive flange axially between the two cover plates, the drive flange being configured for connecting to a transmission input shaft.

10. A torque converter comprising:
    the damper assembly as recited in claim 1; and
    a turbine drivingly connected to the damper assembly.

11. A method of forming a damper assembly for a torque converter comprising:
    fixing a spring support plate to a spring retainer; and
    inserting a spring into an inlet gap formed by a first section of an outer circumference of the spring support plate and the spring retainer such that a second section of the outer circumference of the spring support plate and the spring retainer axially hold the spring in place in an interior of the spring retainer.

12. The method as recited in claim 11 wherein the inserting the spring includes inserting a longitudinal end of the spring through the inlet gap and sliding an outer circumference of the spring along an interior surface of the spring retainer until a circumferential edge of the longitudinal end contacts a seat in the interior space.

13. The method as recited in claim 11 wherein the spring retainer is part of a first cover plate, the method further comprising fixing the first cover plate to a second cover plate before the inserting the spring.

14. The method as recited in claim 11 wherein the spring support plate is fixed to the spring retainer such that the inlet gap is greater in size than an outer diameter of the spring.

15. The method as recited in claim 11 wherein the inlet gap is defined by a distance between an innermost radial surface of an axial tip of a free end of the spring retainer and an axial edge of the first section.

16. The method as recited in claim 11 wherein the spring support plate is fixed to the spring retainer such that the second section is spaced from the spring retainer a distance less than an outer diameter of the one spring.

17. The method as recited in claim 16 wherein the distance the second section is spaced from the spring retainer defined by an innermost radial surface of an axial tip of a free end of the spring retainer and an axial edge the second section.

\* \* \* \* \*